United States Patent
Lal et al.

(10) Patent No.: US 12,002,172 B2
(45) Date of Patent: Jun. 4, 2024

(54) METHODS AND SYSTEMS FOR SELECTING A 3D OBJECT FOR DISPLAY IN AN EXTENDED REALITY ENVIRONMENT

(71) Applicant: ROVI GUIDES, INC., San Jose, CA (US)

(72) Inventors: Dhananjay Lal, Englewood, CO (US); Reda Harb, Issaquah, WA (US)

(73) Assignee: Rovi Guides, Inc., San Jose, CA (US)

( * ) Notice: Subject to any disclaimer, the term of this patent is extended or adjusted under 35 U.S.C. 154(b) by 79 days.

(21) Appl. No.: 17/945,778

(22) Filed: Sep. 15, 2022

(65) Prior Publication Data

US 2024/0096029 A1    Mar. 21, 2024

(51) Int. Cl.
*G06T 19/00* (2011.01)
*G06T 19/20* (2011.01)

(52) U.S. Cl.
CPC ............ *G06T 19/006* (2013.01); *G06T 19/20* (2013.01); *G06T 2219/2016* (2013.01)

(58) Field of Classification Search
None
See application file for complete search history.

(56) References Cited

U.S. PATENT DOCUMENTS

| | | | |
|---|---|---|---|
| 6,118,456 A * | 9/2000 | Cooper | G06T 15/40 345/619 |
| 2017/0200316 A1 | 7/2017 | Giordano et al. | |
| 2018/0300882 A1* | 10/2018 | Kim | G06V 20/64 |
| 2021/0374836 A1* | 12/2021 | Bronicki | G06Q 30/0623 |

OTHER PUBLICATIONS https://admixplay.com/ access from internet Dec. 5, 2022.
https://create.unity.com/vrads access from internet Dec. 5, 2022.

* cited by examiner

*Primary Examiner* — Robert J Craddock
(74) *Attorney, Agent, or Firm* — Haley Guiliano LLP

(57) ABSTRACT

Systems and methods are described for selecting a 3D object for display in an extended reality environment. A space in an extended reality environment is determined for placement of a 3D object. A set of space parameters are determined comprising: an amount of memory available for generating the display of the extended reality environment and an amount of computing power available for generating the display of the extended reality environment. The 3D object is selected for display in the space based on the amount of memory and the amount of computing power available.

20 Claims, 6 Drawing Sheets

METHODS AND SYSTEMS FOR SELECTING A 3D OBJECT FOR DISPLAY IN AN EXTENDED REALITY ENVIRONMENT

BACKGROUND

The present disclosure relates to methods and systems for selecting a 3D object for display in an extended reality environment. Particularly, but not exclusively, the present disclosure relates to selecting a third party 3D object for placement in an extended reality environment based on a real time assessment of a performance capability of a device displaying the extended reality environment.

SUMMARY

Extended reality (XR) experiences, such as gaming and virtual, augmented and mixed reality experiences, provide environments in which a user can see and interact with 3D objects. As more and more users gain access to XR experiences, owing to the proliferation of devices like head-mounted displays, content providers have a greater opportunity to customise the content of the XR environment, e.g., by providing spaces in that XR environment in which specific 3D objects can be placed. In some cases, a content provider may provide space in an XR environment in which third parties, such as other users, other content providers or advertisers, may place a 3D object for viewing and interaction by a user. However, 3D objects can be presented in a vast spectrum of detail (cartoonish, to highly photorealistic) and offer interaction and customization opportunities in the XR experience without branching off to another site. Furthermore, a third party's 3D object needs to be dynamically loaded in at runtime to the XR environment, which presents challenges, e.g., as a result of the performance capability of the user device generating the XR environment.

Systems and methods are provided herein for improving how 3D content is placed in an XR environment, e.g., by providing real time parameters relating to the computational operation of a user device being used to access a XR environment, such as memory and processing capability. Such systems and methods allow for the extension of conventional real time bidding processes for the placement of content into a 3D interactive environment.

According to some examples, methods and systems are provided for selecting a 3D object for display in an extended reality environment. A space in an extended reality environment for placement of a 3D object is determined. A set of space parameters is determined, the space parameters comprising: an amount of memory available for generating the display of the extended reality environment, e.g., the display of the 3D object in the space of the XR environment; and an amount of computing power available for generating the display of the extended reality environment, e.g., the display of the 3D object in the space of the XR environment. In some examples, the amount of memory and computing power available are determined in real time, e.g., based on a current operational status of a user device used to access the XR environment. The 3D object is selected for display in the space based on the amount of memory and the amount of computing power available.

In some examples, a set of 3D object parameters is determined. The set of 3D object parameters may comprise: an amount of memory required for displaying the 3D object; and an amount of computing power required for displaying the 3D object. In some examples, the set of 3D object parameters is compared to the 3D space parameters.

In some examples, the 3D object is selected for display is based on a bid received from a 3D object provider.

In some examples, the space in the extended reality environment comprises a volume boundary. In some examples, the 3D object is scaled and/or fit relative to the volume boundary, based on the bid.

In some examples, the space in the extended reality environment comprises a volume boundary. In some examples, the 3D object is scaled and/or fit relative to the volume boundary, boundary based on a native model volume of the 3D object.

In some examples, multiple 3D objects are selected for display in the space in the extended reality environment.

In some examples, determining the space in the extended reality environment comprises: determining a predefined space in a 3D game; determining a space in an augmented reality environment clear from obstructions; or determining a space in a virtual reality environment based on a defined area of the virtual reality environment.

In some examples, a likelihood of a user interacting with the space is determined based on a user parameter, e.g., height, gaze, reach, interaction history, of a user in the extended reality environment. In some examples, the set of space parameters further comprises the likelihood of a user interacting with the space.

In some examples, a quality of impression of the 3D object is determined in response to a user interaction with the 3D object.

In some examples, the set of space parameters is updated based on the quality of impression.

In some examples, the XR environment, e.g., a portion of the XR environment, may be generated for display, and determining the amount of memory and/or computing power available for generating the display of the 3D object in the space of the XR environment may be determined after the XR environment has been rendered. For example, a total amount of memory and/or computing power available for generating the display of the XR environment including the 3D object in the space of the XR environment may be determined. Once the XR environment has been generated for display, e.g., without the 3D object, using a proportion of the total amount of memory and/or computing power available, a remaining amount of memory and/or computing power available for generating the display of the 3D object may be determined. In some examples, the proportion of memory and/or computing power available for generating for display the XR environment, e.g., without the 3D object, may be reduced, e.g., so that the remaining amount of memory and/or computing power available for generating the display of the 3D object may be increased.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
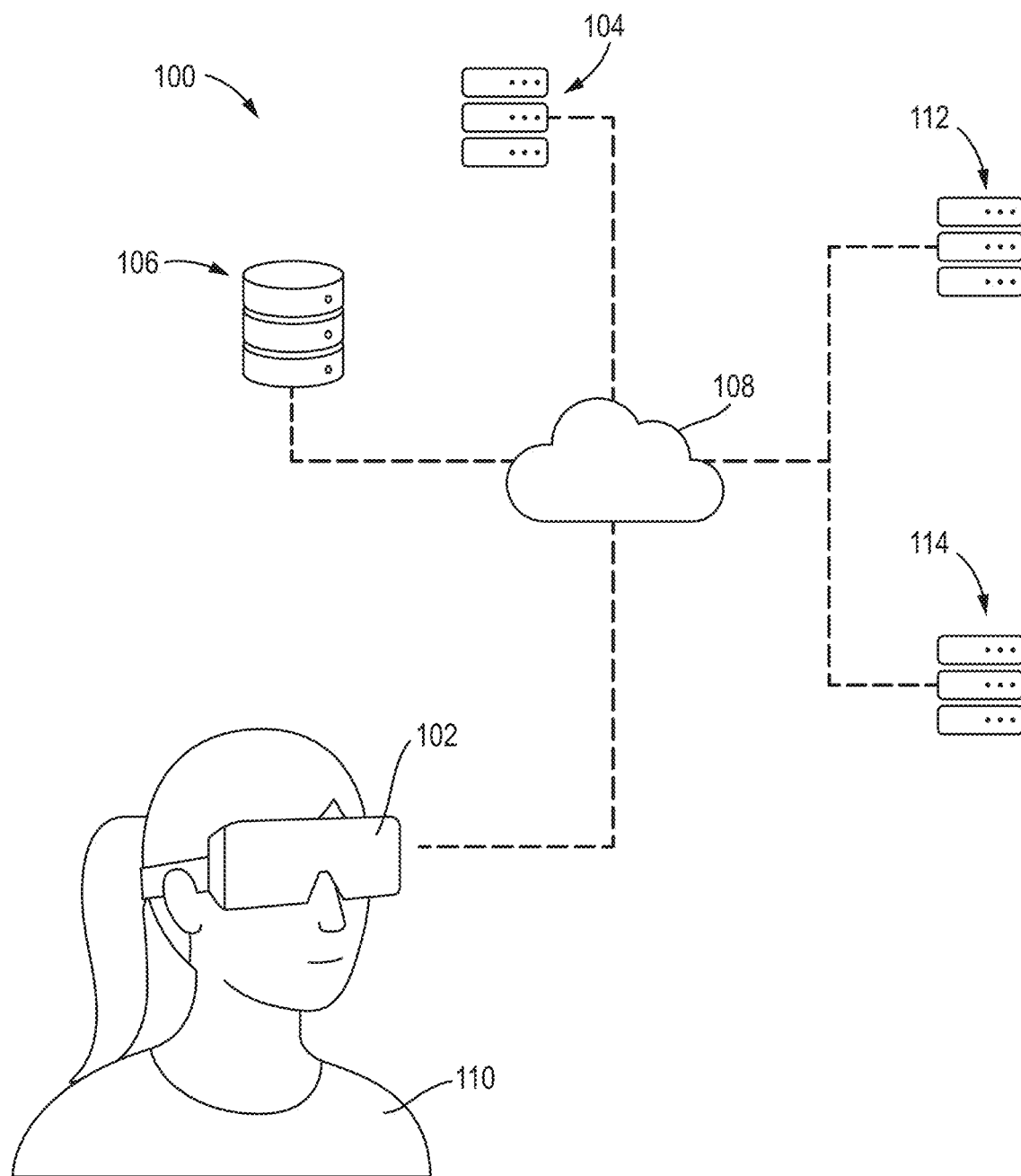
FIG. 1 illustrates overview of the system for selecting a 3D object for display in an XR environment, in accordance with some examples of the disclosure.

FIG. 1 illustrates an overview of a system 100 for selecting a 3D object for display in an XR environment. In particular, the example shown in FIG. 1 illustrates user device 102 communicatively coupled to a server 104 and a content item database 106, e.g., via network 108. In this manner, user device 102 may access an XR environment or service provided by a content provider operating server 104. For example, the XR environment may be a game playable by user 110 when operating user device 102 or a virtual, augmented or mixed reality environment accessible to user 110 when operating user device 102. In the example shown in FIG. 1, system 100 comprises one or more servers of a third party content provider who supplies 3D objects, e.g., ads, for placement in the XR environment. In addition, system 100 comprises server 114, e.g., an exchange server, which manages placement of a 3D object provided by a third party into the XR environment operated by a content provider. Although not shown in FIG. 1, exchange server 114 may be operationally coupled with multiple (e.g., many) third party servers 112 to manage the selection of 3D objects available for placement in the XR environment.

In the context of conventional ad placement, e.g., on a website, exchange server may perform real-time bidding (RTB) to decide which ads should be displayed on a particular content provider's site or in a web search. However, these conventional solutions cannot directly be applied to 3D object placement in an XR environment, as they are designed for the web. For example, conventional solutions assume the availability of display "real estate", i.e., a 2D space inventory, as provided by the content provider, which places very low demand on memory and computing power of the user device on which the website is displayed. This is not true for the spatial web, since the amount of memory and computational power available at any instant at a user device directly influences what may be display in a given 3D space available in an XR environment.

The systems and methods disclosed herein enable one or more 3D objects to be placed in a designated space in an XR environment, e.g., in real time. For example, one or more third party content providers may access a 3D space inventory provided by content provider, wherein that 3D inventory is based, at least in part, on a current amount of memory and computational power (i.e., a "compute budget") available at any instant at a user device being used to access the XR environment. Such systems and methods may be useful in expanding the ways in which third parties, such as other users also accessing the XR environment and/or ad providers, can place content in an XR environment for viewing and interaction by a user. For example, in the context of ad placement, a 3D object may be selected, e.g., by exchange server 112, from multiple different 3D objects provided by various ad providers. In particular, the properties of the 3D object may be matched to the properties of the space in the XR environment, as determined by a current compute budget of the user device. Moreover, the systems and methods disclosed herein enable RTB processes similar to those used for 2D ad placement to be implemented in a 3D environment.

In the example shown in FIG. 1, system 100 includes at least one user device 102, such a head-mounted display (HMD), a tablet computer, a smartphone, a smart television, or the like, configured to display or otherwise provide access to an XR environment. System 100 may also include network 108 such as the Internet, configured to communicatively couple user device 102 to one or more servers 104 and/or one or more content databases 106 from which media content, such as games, music, TV shows, movies and/or ad content, may be obtained for display in the XR environment. User device 102 and the one or more servers 104 may be communicatively coupled to one another by way of network 108, and the one or more servers 104 may be communicatively coupled to content database 106 by way of one or more communication paths, such as a proprietary communication path and/or network 108. In the example shown in FIG. 1, system 100 illustrates how a network of servers may be arranged to allow for a RTB process to be implemented for inserting 3D content into an XR environment.

Figure 2:
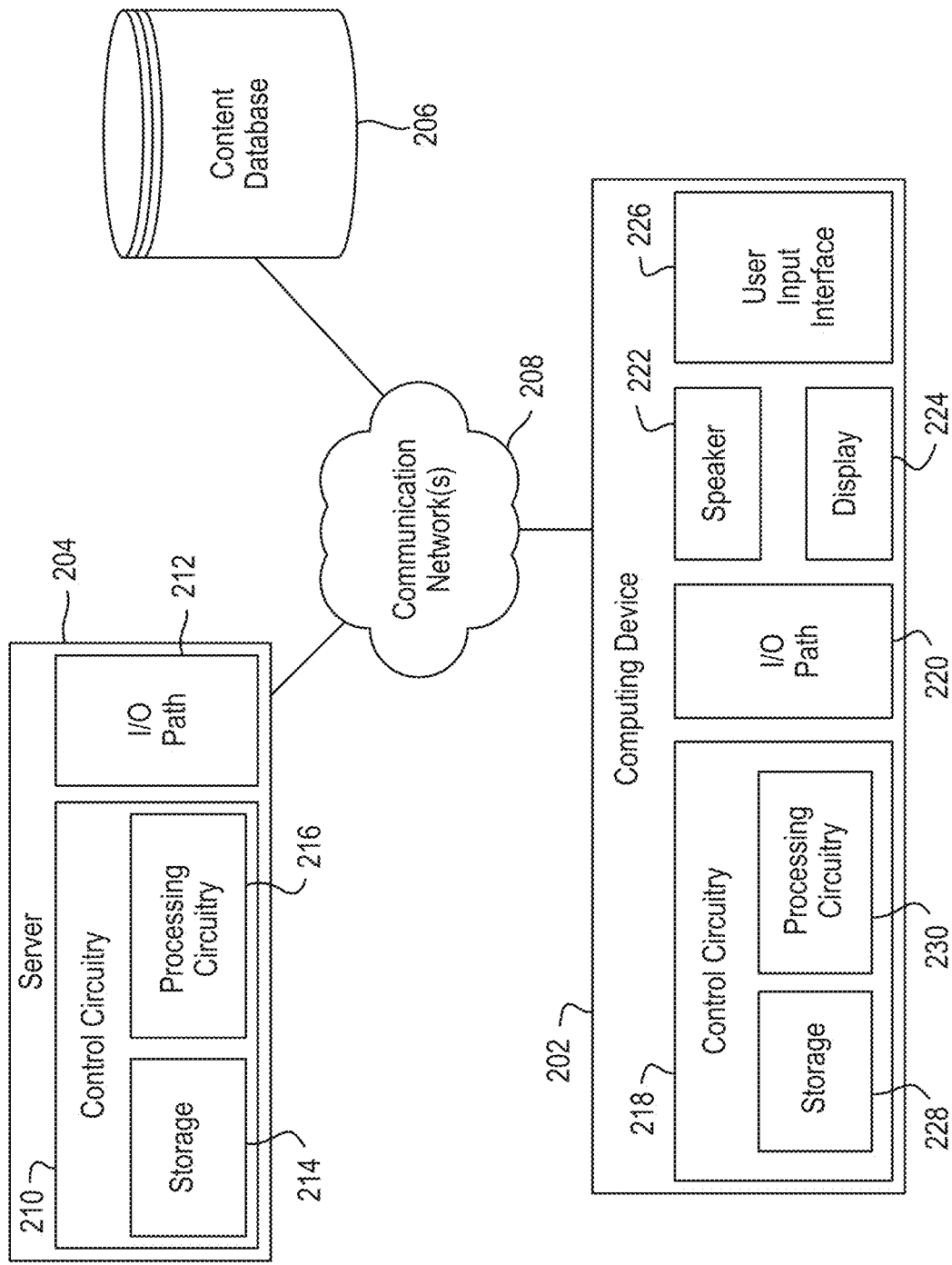
FIG. 2 is a block diagram showing components of an example system for selecting a 3D object for display in an XR environment, in accordance with some examples of the disclosure.

FIG. 2 is an illustrative block diagram showing example system 200 configured to display media content. Although FIG. 2 shows system 200 as including a number and configuration of individual components, in some examples, any number of the components of system 200 may be combined and/or integrated as one device, e.g., as user device 102. System 200 includes computing device 202, server n-204 (denoting any appropriate number of servers, such as server 104, 112 and 114), and content database 206, each of which is communicatively coupled to communication network 208, which may be the Internet or any other suitable network or group of networks. In some examples, system 200 excludes server n-204, and functionality that would otherwise be implemented by server n-204 is instead implemented by other components of system 200, such as computing device 202. For example, computing device 202 may implement some or all of the functionality of server 104, allowing computing device 202 to communicate directly with server 112). In still other examples, server n-204 works in conjunction with computing device 202 to implement certain functionality described herein in a distributed or cooperative manner.

Server n-204 includes control circuitry 210 and input/output (hereinafter "I/O") path 212, and control circuitry 210 includes storage 214 and processing circuitry 216. Computing device 202, which may be a HMD, a personal computer, a laptop computer, a tablet computer, a smartphone, a smart television, or any other type of computing device, includes control circuitry 218, I/O path 220, speaker 222, display 224, and user input interface 226. Control circuitry 218 includes storage 228 and processing circuitry 220. Control circuitry 210 and/or 218 may be based on any suitable processing circuitry such as processing circuitry 216 and/or 230. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some examples, processing circuitry may be distributed across multiple separate processors, for example, multiple of the same type of processors (e.g., two Intel Core i9 processors) or multiple different processors (e.g., an Intel Core i7 processor and an Intel Core i9 processor).

Each of storage 214, 228, and/or storages of other components of system 200 (e.g., storages of content database 206, and/or the like) may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 2D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each of storage 214, 228, and/or storages of other components of system 200 may be used to store various types of content, metadata, and or other types of data. Non-volatile memory may also be used (e.g., to launch a boot-up routine and other instructions). Cloud-based storage may be used to supplement storages 214, 228 or instead of storages 214, 228. In some examples, control circuitry 210 and/or 218 executes instructions for an application stored in memory (e.g., storage 214 and/or 228). Specifically, control circuitry 210 and/or 218 may be instructed by the application to perform the functions discussed herein. In some implementations, any action performed by control circuitry 210 and/or 218 may be based on instructions received from the application. For example, the application may be implemented as software or a set of executable instructions that may be stored in storage 214 and/or 228 and executed by control circuitry 210 and/or 218. In some examples, the application may be a client/server application where only a client application resides on computing device 202, and a server application resides on server n-204.

The application may be implemented using any suitable architecture. For example, it may be a stand-alone application wholly implemented on computing device 202. In such an approach, instructions for the application are stored locally (e.g., in storage 228), and data for use by the application is downloaded on a periodic basis (e.g., from an out-of-band feed, from an Internet resource, or using another suitable approach). Control circuitry 218 may retrieve instructions for the application from storage 228 and process the instructions to perform the functionality described herein. Based on the processed instructions, control circuitry 218 may determine what action to perform when input is received from user input interface 226.

In client/server-based examples, control circuitry 218 may include communication circuitry suitable for communicating with an application server (e.g., server n-204) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the Internet or any other suitable communication networks or paths (e.g., communication network 208). In another example of a client/server-based application, control circuitry 218 runs a web browser that interprets web pages provided by a remote server (e.g., server n-204). For example, the remote server may store the instructions for the application in a storage device. The remote server may process the stored instructions using circuitry (e.g., control circuitry 210) and/or generate displays. Computing device 202 may receive the displays generated by the remote server and may display the content of the displays locally via display 224. This way, the processing of the instructions is performed remotely (e.g., by server n-204) while the resulting displays, such as the display windows described elsewhere herein, are provided locally on computing device 202. Computing device 202 may receive inputs from the user via input interface 226 and transmit those inputs to the remote server for processing and generating the corresponding displays.

A user device may send instructions, e.g., to initiate an XR experience and allow a user to view and interact with 3D objects in an XR environment, to control circuitry 210 and/or 218 using user input interface 226. User input interface 226 may be any suitable user interface, such as a remote control, trackball, keypad, keyboard, touchscreen, touchpad, stylus input, joystick, voice recognition interface, gaming controller, or other user input interfaces. User input interface 226 may be integrated with or combined with display 224, which may be a monitor, a television, a liquid crystal display (LCD), an electronic ink display, or any other equipment suitable for displaying visual images.

Server n-204 and computing device 202 may transmit and receive content and data via I/O path 212 and 220, respectively. For instance, I/O path 212, and/or I/O path 220 may include a communication port(s) configured to transmit and/or receive (for instance to and/or from content database 206), via communication network 208, content item identifiers, content metadata, natural language queries, and/or other data. Control circuitry 210 and/or 218 may be used to send and receive commands, requests, and other suitable data using I/O paths 212 and/or 220.

Figure 3:
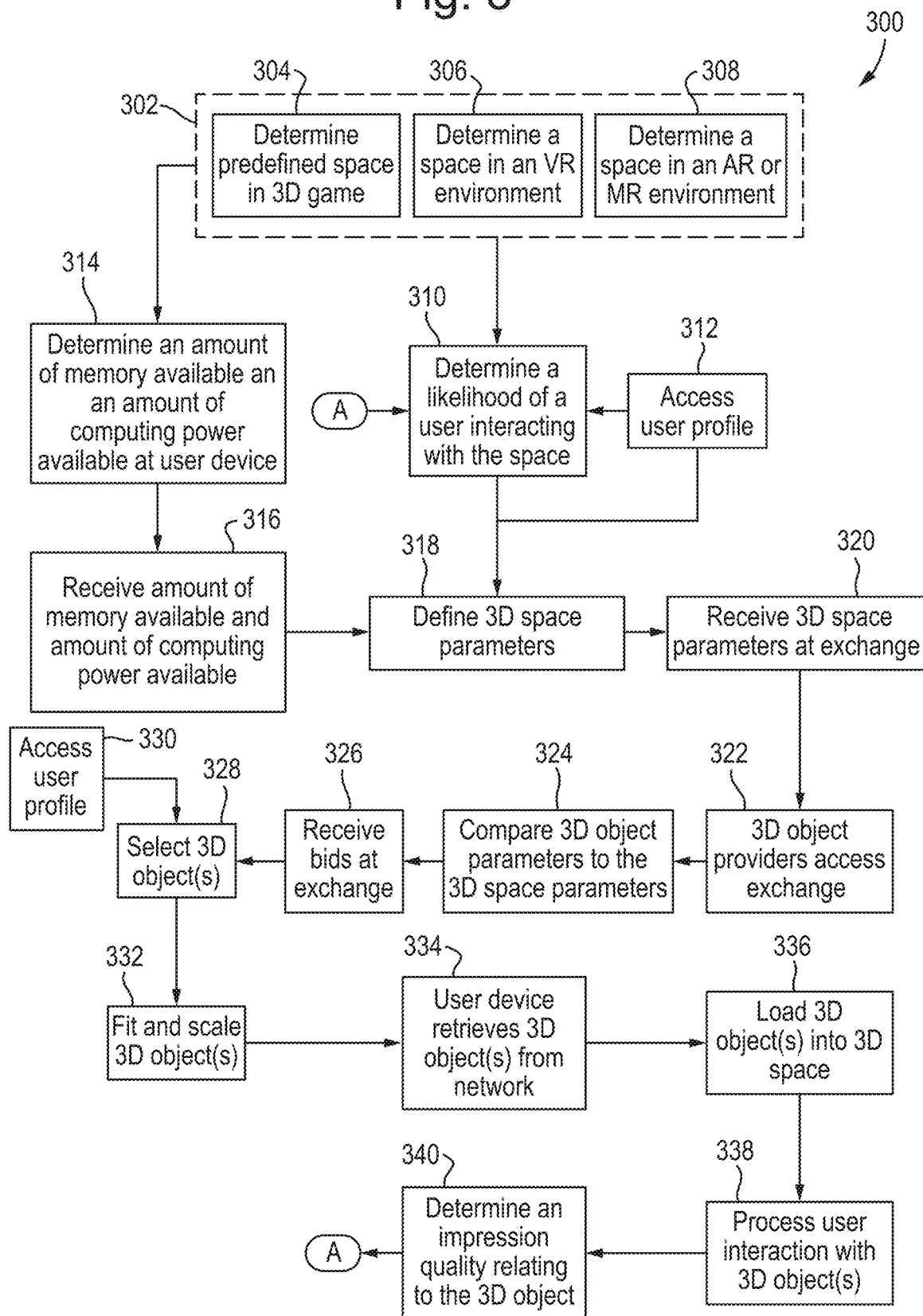
FIG. 3 is a flowchart representing a process for selecting a 3D object for display in an XR environment, in accordance with some examples of the disclosure.
Figure 4:
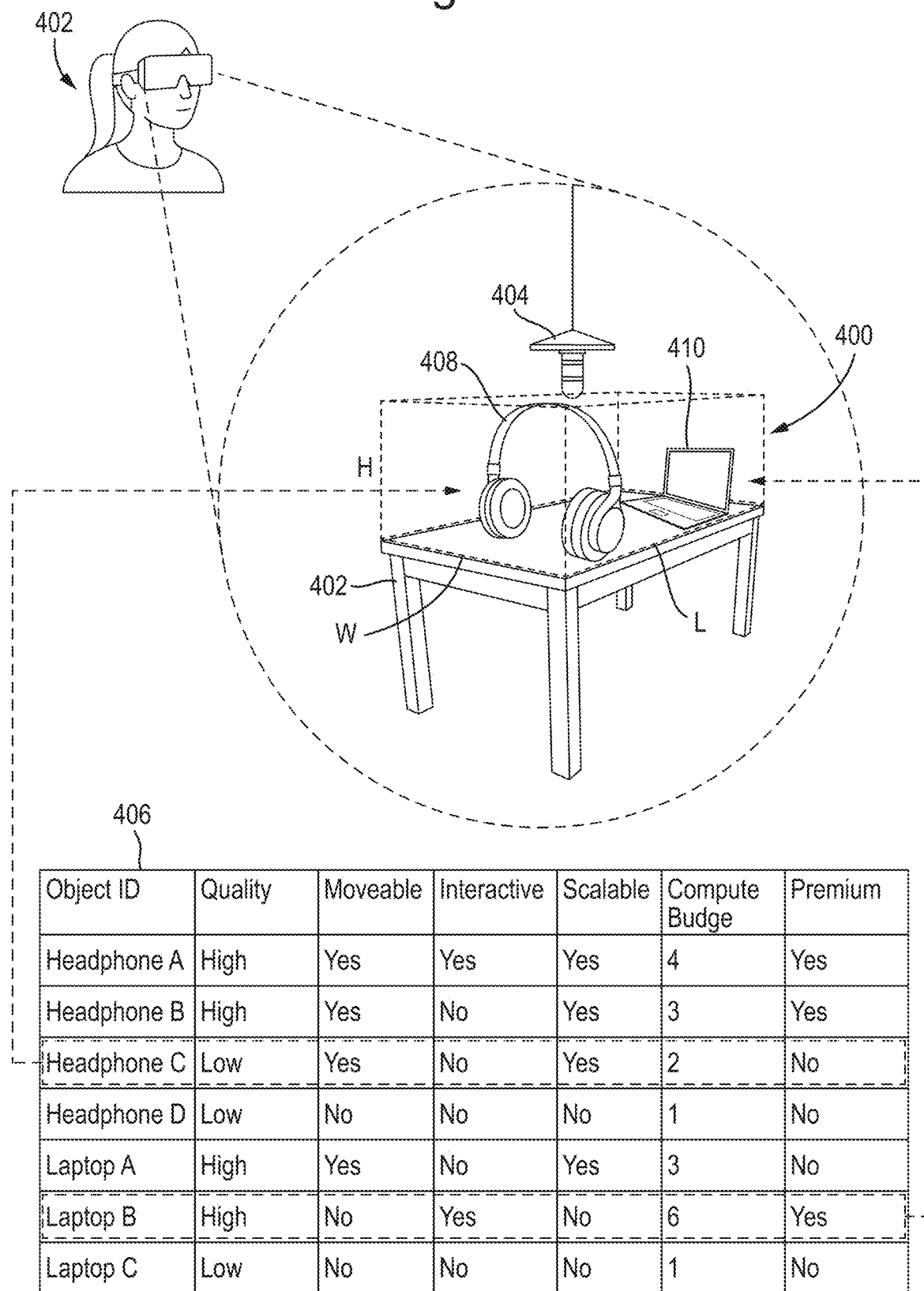
FIG. 4 illustrates an example of selecting and placing a 3D object in a space in an XR environment, in accordance with some examples of the disclosure.
Figure 5:
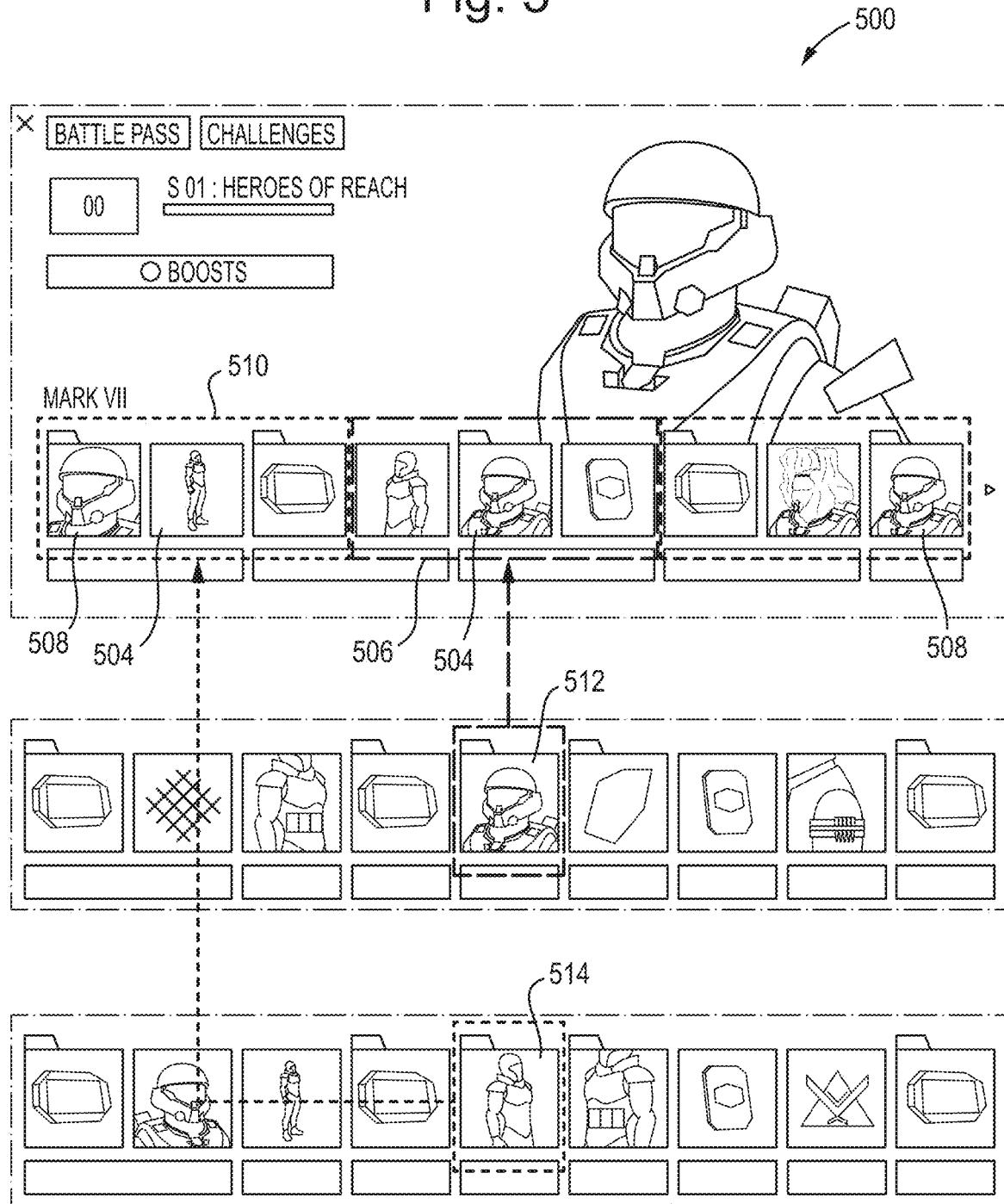
FIG. 5 illustrates another example of selecting and placing a 3D object in a space in an XR environment, in accordance with some examples of the disclosure.
Figure 6:
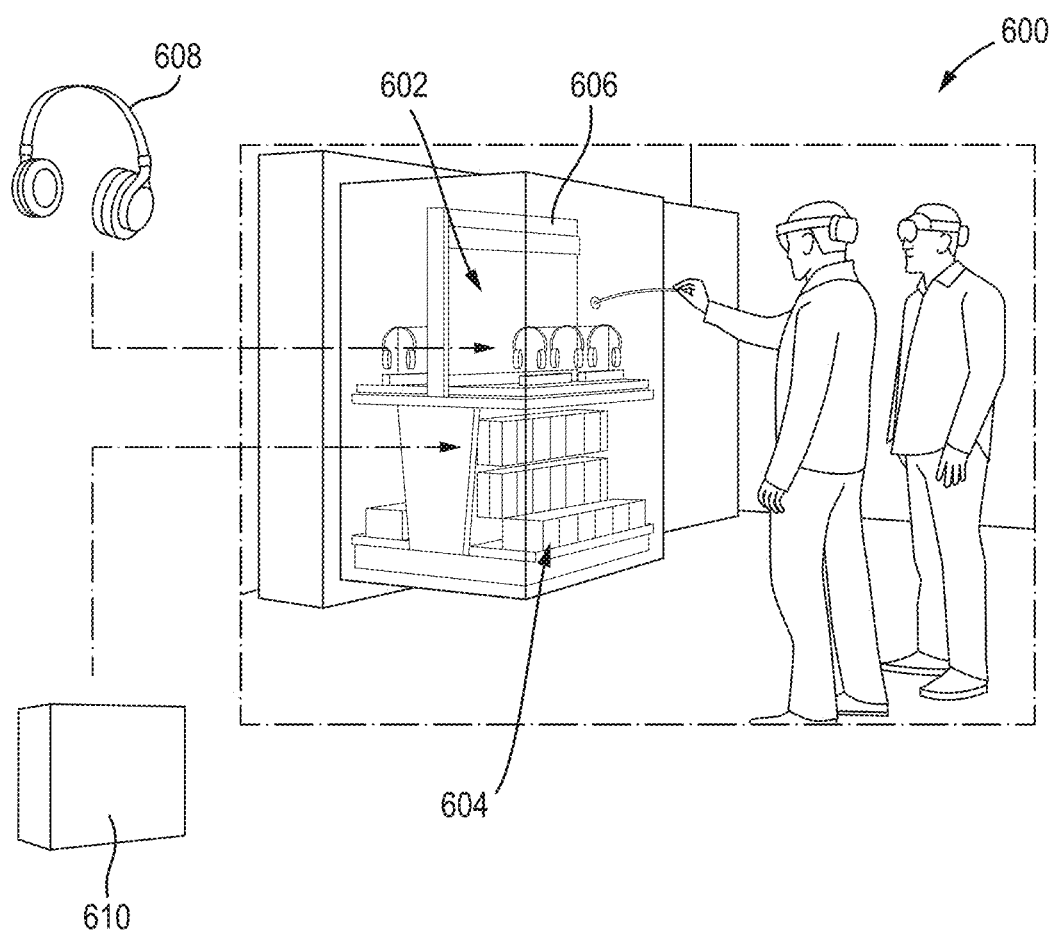
FIG. 6 depicts various zones in an XR environment for placing 3D objects, in accordance with some examples of the disclosure.

FIG. 3 shows a flowchart representing an illustrative process 300 for selecting a 3D object for display in an extended reality environment. FIG. 4 illustrates an example of selecting and placing a 3D object in a space in an XR environment. FIG. 5 illustrates another example of selecting and placing a 3D object in a space in an XR environment. FIG. 6 depicts various zones in an XR environment for placing 3D objects. While the example shown in FIGS. 3 to 6 refers to the use of system 100, as shown in FIG. 1, it will be appreciated that the illustrative process shown in FIGS. 3 to 6, may be implemented on system 100 and system 200, either alone or in combination with each other, and/or any other appropriately configured system architecture.

At 302, control circuitry, e.g., control circuitry of server 104 (operated by a content provider or publisher), determines a space in an XR environment for placement of a 3D object. In the context of the present disclosure, an XR environment may be any appropriate environment that user 110 may access using user device 102. For example, the XR environment may be a 3D gaming environment, or a virtual, augmented or mixed reality. Irrespective of the type of environment, control circuitry determines a space appropriate for a 3D object, provided by a third party, to be placed. For example, at 304, control circuitry determines a whether a predefined space in a game is open for placement of a 3D object by a third party. In some examples, a game publisher may designate certain areas in the game for placement of a 3D object, such as in a menu or in between levels in the game (e.g., see FIG. 5 showing game area 502 comprising multiple spaces 504, in which 3D objects may be placed). In such cases, the game publisher may indicate the size and shape of the spaces(s) available for 3D object placement. In a similar manner, at 306, where the 3D environment is a VR environment, the publisher of the VR environment may designate certain spaces of a VR arena as open for 3D object placement. For example, in the example shown in FIG. 6, the VR arena is a VR shopping arena, in which users may browse certain products. In such cases, the publisher has control over where to allow a third party to place a 3D object, such as space 602 or space 604. Again, the VR arena publisher may indicate the size and shape of the space(s) available for 3D object placement, such as the volume(s) defined by space on virtual display stand 606. Where the 3D environment is a MR or AR environment, at 308, control circuitry, e.g., control circuitry of user device 102 and/or server 104, may determine one or more spaces in the MR/AR environment that is suitable for placement of a 3D object. For example, control circuitry may determine that one or more surfaces, such as a (real-world) table is suitable for placement of one or more 3D objects. In the example shown in FIG. 4, user 402 is nearby table 404. In such a case, control circuitry may be configured to determine, e.g., by virtue of one or more image processing techniques, that a surface of the table 404 is free from obstruction, and is thus open for placement of a 3D object. In particular, control circuitry may determine a volume of the space free from obstruction, e.g., a volume boundary, defined by the surface area of the table and a free height above the table, e.g., a height free from obstruction. In the example shown in FIG. 4, the volume of the space is defined by the length L and the width W of the table, and the height H above the table clear from obstruction, such as by light 404 above table 402.

At 310, control circuitry, e.g., control circuitry of server 104, determines a likelihood of user 102 interacting with the space. For example, where the environment is a game as shown in FIG. 5, a user may have a greater likelihood of interacting with a central section 506 of a menu, as opposed to the outer edge 508 of the menu. Similar methodology may apply to the example shown in FIG. 6. For example, the publisher of the VR shopping arena may assign space 602 a higher likelihood that a user will interact with space 602, as opposed to space 604. In some cases, the likelihood of user interaction may be based on a proximity of the user to the space. For example, control circuitry may separate the VR arena into one or more zones, and base the likelihood of user interaction on the user's proximity to the zones. In some examples, e.g., the AR/MR environment, where the opportunity to place 3D objects varies depends on user location, the likelihood of user interaction may be based on a user parameter, such as height, gaze direction, reach, etc. As such, one or more user parameters may be used to help determine whether a user is likely to interact with a designated space.

At 312, control circuitry accesses a user profile to determine one or more user parameters. For example, the user profile may contain data relating to the user's physical characteristics, such as height, and/or one or more trends relating to how a user interacts with an XR environment. In the case where a user is tall, or standing, control circuitry may determine that that user is more likely to interact with a higher up space, such as space 602, than a lower down space, such as space 604 in FIG. 6. In a similar manner, control circuitry may access gaze-tracking data in a user profile to determine that a user is more likely to interact with a centrally located space, such as space 506, than a peripheral space, such as space 508 in FIG. 5.

At 314, control circuitry, e.g., control circuitry of user device 102, determines an amount of memory available and an amount of computing power available for generating the display of a 3D object in the space determined at 302 (i.e., the compute budget). At 316, the compute budget is received at control circuitry of server 104. For example, control circuitry of user device 102 may determine at any given moment, the amount of RAM available to store the 3D object and the amount of processing power available to render the 3D object when placed in the space in the XR environment, and transmit this information to server 104. Making such a determination is important, since the amount of memory and computing power available may vary depending on other operational conditions of the user device 102, e.g., as the user device 102 performs one or more other operations, display-based or otherwise, while generating the XR environment for the user. As such, it may not be possible to consistently load the same or similar 3D objects into the same space in the XR environment, owing to the changing storage and processing capacity at the user device 102. To add context, 3D objects are memory intensive, and these assets need to be kept in RAM for user interaction. Unlike 2D images, 3D models have geometries/meshes, textures and animations associated with them. High polygon or "High Poly" models can run into several GBs of memory. Further, textures are images that can consume significant memory. However, a user device for accessing a XR environment, such as a VR HMD, has limited memory, for example the around 6 GB of RAM. Additionally, if the model has any animations, then these will also have to be loaded into memory prior to display and these may also be memory intensive. Overall, a user device may have limited compute budget for rendering 3D assets, since 3D assets need to be rendered based on the perspective of the game player or the user wearing an HMD. Embedded devices may lack the compute horsepower to render very high poly intricate models. Device render compute power may be represented by a FLOPS capability inherent to the GPU make and model. The compute power requirement for a 3D model is crudely represented by its poly count.

In some examples, the compute budget may be an amount of memory and/or computing power available for generating the display of the 3D object in the space of the XR environment after the XR environment has been generated for display, e.g., after the XR environment has been rendered. In other words, the XR environment may be generated for display comprising the objects that are native to that XR environment, such as menu 510 in FIG. 5 or display case 606 in FIG. 6. Once the XR environment has been generated for display (e.g., including the native objects), the compute budget, e.g., the amount of memory and/or computing power available for generating the display of the 3D object in the space of the XR environment, may be determined. For example, a total amount of memory and/or computing power available for generating the display of the XR environment including the 3D object may be determined. Once the XR environment has been generated for display, e.g., without the 3D object, using a proportion of the total amount of memory and/or computing power available, a remaining amount of memory and/or computing power available for generating the display of the 3D object may be determined. In some cases, the amount of memory and/or computing power utilized in generating the XR environment for display (e.g., including the native objects) may vary over time, e.g., as different scenes in the XR environment are generated. For example, a menu screen may utilize less memory and/or computing power than an action scene in a game. As such, the compute budget for generating the display of the 3D object in the space of the XR environment may vary correspondingly, e.g., as the XR environment in generated for display (e.g., in real time or near-real time). In some examples, the proportion of memory and/or computing power available for generating for display the XR environment, e.g., without the 3D object, may be reduced, so that the remaining amount of memory and/or computing power available for generating the display of the 3D object may be increased. For example, when the XR environment comprising native objects utilizes a large proportion of the total amount of memory and/or computing power available, e.g., a large enough proportion to prevent an additional 3D object being generated for display, one or more display parameters of the XR environment comprising native objects may be adjusted (e.g., by reducing a quality factor), to free up compute budget for generating the display of the 3D object Such a process may be based on one or more bids received at 326, described below. In some examples, the compute budget may be determined prior to the XR environment including native objects being generated for display, e.g., before the XR environment having native objects is initially rendered. This allows for the compute budget to be determined at an earlier stage, such that information regarding the compute budget is available earlier in process 300. For example, control circuitry may determine an amount of compute budget that will be utilized in generating a particular scene in the XR environment. For example, control circuitry may access a database comprising data related to how much compute budget is needed to generate various XR environments having various native objects. The amount of compute budget that will be utilized may be subtracted from a total amount of compute budget available, e.g., before an XR environment is generated for display. In this manner, the remaining amount of compute budget may be utilized for generating the display of one or more (non-native) 3D object(s), and a selection of which 3D object(s) to include/exclude can be made based on this remaining amount of compute budget, in particular, prior to using a portion the compute budget for rendering the XR environment.

In order to account for this, at 318, control circuitry, e.g., control circuitry of server 104, sets parameters that define the space available for placement of a 3D object in the determined space ("3D space parameters") based on the compute budget of the user device 102, e.g., at a given instant, and the likelihood of a user interacting with the space determined at 310. In some examples, control circuitry may access a user profile to include in the 3D space parameters one or more user preferences. For example, the 3D space parameters may comprise information relating to the context of the space in the XR environment, e.g., game level status, a setting of a VR environment, or a geographical location at which the AR/MR environment is generated. This may further assist users in being provided with a 3D object relevant to their current situation.

At 320, control circuitry, e.g., control circuitry of exchange server 114, receives the 3D space parameters. For example, the exchange server 114 is configured to interface with multiple content providers and manage the placement of 3D objects, from one or more 3D object providers, into multiple XR environments.

At 322, one or more 3D object providers, such as ad providers, connect to exchange server 114 to access 3D space parameters relating to various 3D spaces that are offered by content provider servers for placement of 3D objects. Taking the example shown in FIG. 4, 3D object providers are able to access the 3D space parameters relating to the volume boundary above the surface of table 402. In the example shown in FIG. 5, 3D object providers are able to access the 3D space parameters relating to spaces available in menu 510. In the example shown in FIG. 6, 3D object providers are able to access the 3D space parameters relating to spaces 602 and 604 available in virtual display 606.

At 324, control circuitry, e.g., control circuitry of third party server 114, compares 3D object parameters to the 3D space parameters, e.g., to determine one or more suitable 3D objects for supply to user device 102 for placement in the XR environment. For example, 3D object provider may have various versions of a 3D object. In the example shown in FIG. 4, data structure 406 includes various versions of a 3D object representing a pair of headphones 408. For example, the various versions of headphones 408 and laptop 410 may have different characteristics relating to quality, whether the object is moveable, interactive, and/or scalable. Importantly, the data structure 406 includes a compute budget for each version, e.g., as a result of its quality, moveability, level of interactives, and/or scalability. Additionally or alternatively, each version may be designated as a premium version, indicating that a 3D object provider is willing to place the object in a prioritized space, as defined by the content provider, e.g., a space that has a great chance of user interaction. In this manner, the third parties providing the 3D object of placement can match a 3D object to an available space, and place a bid with exchange server 112 to place the 3D object in the space in the users XR environment.

At 326, control circuitry, e.g., control circuitry of exchange server 112, receives bids for placing one or more 3D objects in a space. E.g., in a RTB process, the highest bid for placement of a 3D object in a particular space is typically accepted.

At 328, control circuitry, e.g., control circuitry of exchange server 112, selects one or more 3D objects for placement into the space. For example, depending on the 3D object parameters relating to the object, or object variant, control circuitry selects one or more 3D objects to best fit the space, subject to the highest bid. Moreover, control circuitry may perform a verification check to ensure that the 3D object parameters match the 3D space parameters to reduce the probability of any problems when loading in the 3D object to the space in the XR environment. In some examples, control circuitry accesses a user profile at 330 to check that the object matches one or more user preferences. For example, a user may set a preference for electronic items, or certain themed in-game purchase. As such, control circuitry may filter objects relating to highest bids based on the content and/or theme of the object. For example, where a user indicates an interest in electronics, exchange server may filter out objects relating to fashion, for example, since these may be of little interest to the user. Additionally or alternatively, control circuitry may group objects having a common theme, e.g., so that object in an electronic category are provided in the same or adjacent spaces. In the example shown in FIG. 4, the exchange server selects a bid relating to "Headphone ID C" and "Laptop ID B". Selection of these two objects is based on a multiple factors. For example, the 3D space parameters may have specified a total compute budget of 8 (taken as an arbitrary number for the sake of example). The exchange server may have received bids from the provider of the headphones for placement of "Headphone ID B" (compute budget 3) and "Headphone ID C" (compute budget 2) in space 400, and a bid from the provider of the laptop for placement of "Laptop ID B" (compute budget 6). In such a case, exchange server selects the combination of 3D objects having, in combination, 3D object parameters, that best match the 3D space parameters, defined at 318. As such, bids for "Headphone ID C" and "Laptop ID B" are selected, since these bids, in combination, best match the available space. The examples shown in FIGS. 5 and 6 operate in a similar manner. In FIG. 5, object 512 is selected for placement in space 506 and object 514 is selected for placement in space 508. In FIG. 6, object 608 is selected for placement in space 602 and object 610 is selected for placement in space 604.

At 332, control circuitry, e.g., control circuitry of exchange server, scales and fits the 3D objects to the 3D spaces. For example, the 3D object provider may store an object on a content distributed network in its native size. The 3D object provider may set a minimum and a maximum size for the display of its 3D object in the XR environment. This helps ensure that the object is displayed within control parameters defined by the object provider. The minimum and maximum size of the asset is defined by a minimum (Smin) and maximum (Smax) on a scaling parameter that is provided by the object provider. When the exchange selects an object, it ensures that the native model volume (e.g., the 3D bounding box of the object) can be scaled to the volume boundary for the space received from the content provider. For example, the object may be made bigger or smaller based on the volume boundary of the space. For example, a scaling parameter S may be set as Smin≤S≤Smax based on the relative sizes of the native model volume and the volume boundary for the space. In the example shown in FIG. 5, objects 512 and 514 are scaled to fit the entirety of spaces 506 and 510 respectively. In the example shown in FIG. 6, objects 608 and 610 are scaled so that they are in proportion with display stand 606. For example, this may be a condition set in the 3D space parameters, and bids may have been placed for only a portion of the space. In the example shown in FIG. 4, the object providers are able to bid for a desired portion of the volume of space 400. For example, the object providers may provide to the exchange server: i) a bid in $/Volume. The bid itself is the cost that the object provider is willing to pay per volume of 3D space 400, ii) the volume of the 3D object (as natively supplied), iii) scaling parameters Smin and Smax (lower and upper control limits of the scaling parameter S that may be applied to the 3D object to make it smaller or bigger than the native volume, iv) a memory requirement for the object (e.g., RAM in MB or GB), and v) computing power requirement for rendering the object (e.g., number of polygons). In this case, the maximum bid will be:

$$BID_{MAX}=(\$/\text{Volume Bid})\cdot Smax$$

In the example shown in FIG. 4, the maximum bids from each of the headphone provider and the laptop provider resulted in the headphones being scaled so as to fill as much of the height of space 400 as possible, leaving the laptop to be place in the remaining space (noting that "Laptop ID B" did not allow for it to be scaled, and, as such, is placed in space 400 at its native volume. Such a situation may be beneficial where an object has layers of interaction. For example, the headphones may be provided simply as a model that a user can see and move, whereas the laptop may be interactive, e.g., a user can use certain features on the laptop. As such, it is desirable to provide a model with a small native model volume.

At 334, control circuitry, e.g., control circuitry of exchange server 114, provides user device 102 with information for retrieving the object from a CDN, and the user device 102 retrieves the object.

At 336, control circuitry, e.g., control circuitry of user device 102, loads the 3D objects into the space, so the user can see and interact with the object in the XR environment.

At 338, control circuitry, e.g., control circuitry of user device 102 and/or server 104, processes user interactions with the 3D object in the space. For example, control circuitry may determine a number and/or type of user interactions, e.g., by virtue of monitoring a user's gestures and/or gaze, or actual engagement with the object, e.g., where the object is provided with layered interactions, such as laptop 410.

At 340, control circuitry, e.g., control circuitry of user device 102 and server 104, determines an interaction quality relating to the user interaction. For example, control circuitry may determine an interaction period based on how long a user actively engages with the 3D object while it is in runtime memory. This give a direct indication of how effective the placement of the object in the XR environment has been. This data is accessible by the content provider without relying on impression feedback from the exchange server 114, which typically happens for 2D assets placed on websites, for example. The present systems and methods are further beneficial as the provide direct feed back of the interaction quality to the content provider (e.g., see feedback arrow A from 340 to 310). In some example, this feedback can be used by the content provider when defining a next set of 3D space parameters relating to the one or more spaces available in the XR environment for object placement. For example, a space that previously was rank as a low likelihood of user interaction, may be upgraded to a higher likelihood of user interaction based on the runtime user interaction with a placed 3D object, which can better optimise the use of computer resource when placing future objects.

The actions or descriptions of FIG. 3 may be done in any suitable alternative orders or in parallel to further the purposes of this disclosure.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features and limitations described in any one example may be applied to any other example herein, and flowcharts or examples relating to one example may be combined with any other example in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   determining a space in an extended reality environment for displaying a 3D object;
   determining a set of space parameters comprising:
      an amount of memory available for generating the display of the 3D object in the space; and
      an amount of computing power available for generating the display of the 3D object in the space; and
   selecting the 3D object for display in the space based on the set of space parameters.

2. The method according to claim 1, wherein the method comprises:
   determining a set of 3D object parameters comprising:
      an amount of memory required for displaying the 3D object; and an amount of computing power required for displaying the 3D object; and comparing the set of 3D object parameters to the 3D space parameters.

3. The method according to claim 1, wherein selecting the 3D object for display is based on a bid received from a 3D object provider.

4. The method according to claim 3, wherein the space in the extended reality environment comprises a volume boundary, the method further comprising fitting and/or scaling the 3D object relative to the volume boundary based on the bid.

5. The method according to claim 1, wherein the space in the extended reality environment comprises a volume boundary, the method further comprising fitting and/or scaling the 3D object relative to the volume boundary based on a native volume of the 3D object.

6. The method according to claim 1, the method comprising selecting multiple 3D objects for display in the space in the extended reality environment.

7. The method according to claim 1, wherein determining the space in the extended reality environment comprises:
   determining a predefined space in a 3D game;
   determining a space in an augmented reality environment clear from obstructions; or
   determining a space in a virtual reality environment based on a defined area of the virtual reality environment.

8. The method according to claim 1, wherein the method comprises:
   determining a likelihood of a user interacting with the space based on a user parameter of a user in the extended reality environment, wherein the set of space parameters further comprises the likelihood of a user interacting with the space.

9. The method according to claim 1, wherein the method comprises:
   determining a quality of impression of the 3D object in response to a user interaction with the 3D object.

10. The method according to claim 9, wherein the method comprises:
    updating the set of space parameters based on the quality of impression.

11. A system comprising control circuitry configured to:
    determine a space in an extended reality environment for placement of a 3D object;
    determine a set of space parameters comprising:
        an amount of memory available for generating the display of the 3D object in the extended reality environment; and
        an amount of computing power available for generating the display of the 3D object in the extended reality environment; and
    select the 3D object for display in the space based on the amount of memory and the amount of computing power available.

12. The system according to claim 11, wherein the control circuitry configured to:
    determine a set of 3D object parameters comprising:
        an amount of memory required for displaying the 3D object; and
        an amount of computing power required for displaying the 3D object; and
    compare the set of 3D object parameters to the 3D space parameters.

13. The system according to claim 11, wherein selecting the 3D object for display is based on a bid received from a 3D object provider.

14. The system according to claim 13, wherein the space in the extended reality environment comprises a volume boundary, wherein the control circuitry is configured to fit and/or scale the 3D object relative to the volume boundary based on the bid.

15. The system according to claim 11, wherein the space in the extended reality environment comprises a volume boundary, wherein the control circuitry is configured to fit and/or scale the 3D object relative to the volume boundary based on a native volume of the 3D object.

16. The system according to claim 11, wherein the control circuitry is configured to select multiple 3D objects for display in the space in the extended reality environment.

17. The system according to claim 11, wherein, when determining the space in the extended reality environment, the control circuitry is configured to:
    determine a predefined space in a 3D game;
    determine a space in an augmented reality environment clear from obstructions; or
    determine a space in a virtual reality environment based on a defined area of the virtual reality environment.

18. The system according to claim 11, wherein the control circuitry is configured to:
    determine a likelihood of a user interacting with the space based on a user parameter of a user in the extended reality environment, wherein the set of space parameters further comprises the likelihood of a user interacting with the space.

19. The system according to claim 11, wherein the control circuitry is configured to:
    determine a quality of impression of the 3D object in response to a user interaction with the 3D object.

20. The system according to claim 19, wherein the control circuitry is configured to:
    update the set of space parameters based on the quality of impression.

* * * * *